United States Patent [19]

DeLorimiere

[11] Patent Number: 4,844,917
[45] Date of Patent: Jul. 4, 1989

[54] CAKE FROSTING ASSEMBLY

[76] Inventor: Marion DeLorimiere, Box 251 Bockes Rd., Greenfield Center, N.Y. 12833

[21] Appl. No.: 726,639

[22] Filed: Apr. 24, 1985

[51] Int. Cl.$^4$ .............................................. B65D 81/32
[52] U.S. Cl. ..................................... 426/87; 426/108; 426/112; 426/115; 426/249; 426/250; 426/572; 206/222; 222/94; 222/107; 141/329; 141/330; 141/363; 141/364; 141/114
[58] Field of Search ................ 426/112, 115, 120, 108, 426/250, 249, 87; 222/94, 107; 206/219–222; 141/329, 330, 363, 364, 114

[56] References Cited

U.S. PATENT DOCUMENTS

| | | | |
|---|---|---|---|
| 1,233,802 | 7/1917 | Lowe et al. | 222/107 |
| 1,254,115 | 1/1918 | Brand | 426/85 |
| 2,129,839 | 9/1938 | Henderson | 222/107 |
| 2,184,712 | 12/1939 | Fleissig | 222/107 |
| 2,240,522 | 5/1941 | Serr | 426/120 |
| 2,322,213 | 6/1943 | Amberg | 222/107 |
| 2,374,796 | 5/1945 | Amberg | 222/107 |
| 2,385,506 | 9/1945 | Gurwick | 222/107 |
| 2,398,505 | 4/1946 | Pepin | 222/107 |
| 2,502,920 | 4/1950 | Brown | 426/112 |
| 2,528,530 | 11/1950 | Machleder | 206/222 |
| 2,543,724 | 2/1951 | Iwanowski | 141/363 |
| 2,598,595 | 5/1952 | Peters | 426/112 |
| 2,631,521 | 3/1953 | Atkins | 206/222 |
| 2,652,336 | 9/1953 | Hensgen et al. | 426/112 |
| 2,719,628 | 10/1955 | Ivanoff | 141/363 |
| 2,773,521 | 12/1956 | Persson | 141/364 |
| 2,824,010 | 2/1958 | Pedersen | 206/222 |
| 2,849,321 | 8/1958 | Lhermitte et al. | 426/85 |
| 2,881,953 | 4/1959 | Kuschel | 222/94 |
| 2,984,570 | 5/1961 | Prell | 206/222 |
| 3,090,071 | 5/1963 | Brooy | 222/107 |
| 3,128,913 | 4/1964 | Specketer | 222/107 |
| 3,260,411 | 7/1966 | Dobson | 222/107 |
| 3,261,381 | 7/1966 | Roach | 222/94 |
| 3,297,207 | 1/1967 | Ballin | 222/107 |
| 3,601,252 | 8/1971 | Sager | 426/115 |
| 3,720,524 | 3/1973 | Nakagami | 206/222 |
| 3,852,494 | 12/1974 | Williamson | 426/383 |
| 3,857,423 | 12/1974 | Ronca | 141/364 |
| 3,941,167 | 3/1976 | Wirtz et al. | 141/329 |
| 3,993,223 | 11/1976 | Welker et al. | 222/107 |
| 4,244,467 | 1/1981 | Cavazza | 206/222 |
| 4,392,492 | 7/1983 | Pick | 206/219 |
| 4,452,378 | 6/1984 | Christine | 222/107 |

OTHER PUBLICATIONS

Better Homes & Gardens 11/71, p. 168, McCormick Advertisement.

*Primary Examiner*—Steven Weinstein
*Attorney, Agent, or Firm*—Low & Low

[57] ABSTRACT

A cake frosting technique and assembly including a disposable frosting bag for home or commercial use to render the frosting or decorating of cakes or other pastries more convenient and expeditious by the complete elimination of the need for expensive and messy heretofore-used large commercial squeeze bags, or manually whipped and spread frosting, or expensive aerosols. The invention contemplates the ready coloring or tinting of the frosting to any desired hue within a wide range with any particular color and further contemplates the imparting of any desired flavoring to the frosting by the separate and conveniently associated provision of the aforesaid disposable bag containing a neutral or white frosting along with a plurality of separate color tint tubes and a plurality of separate flavor taste tubes, whose contents are to be admixed respectively with the base frosting material to achieve a desired blend for the ultimate decorative and taste effects contemplated.

10 Claims, 1 Drawing Sheet

U.S. Patent  Jul. 4, 1989  4,844,917
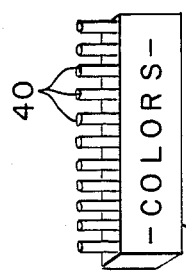
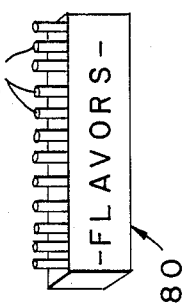
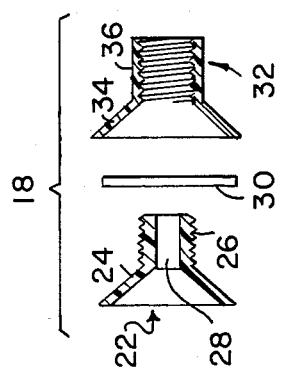
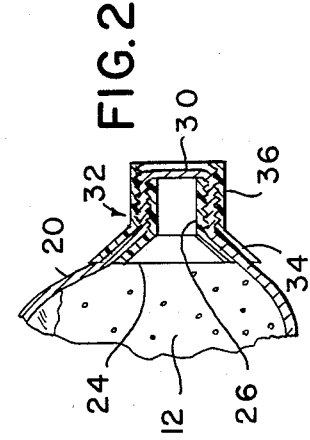
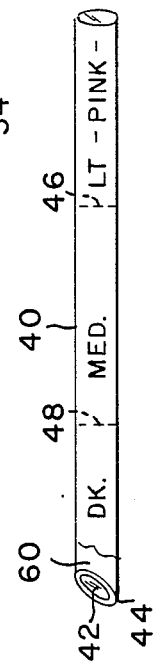
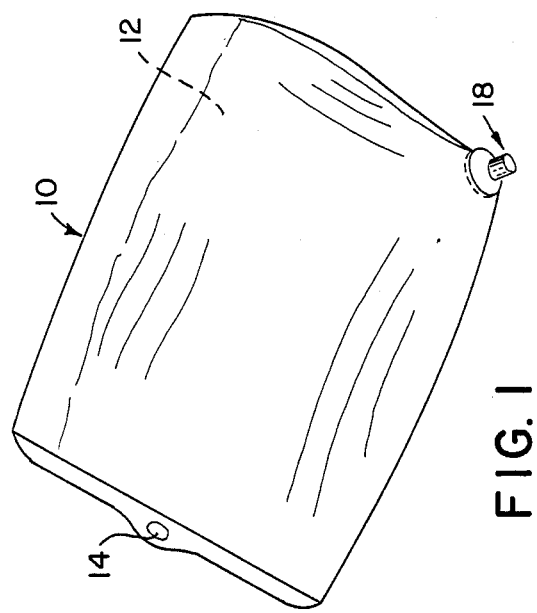

CAKE FROSTING ASSEMBLY

BACKGROUND OF THE INVENTION

Decoration of cakes, pastries or like foodstuffs as with an attractive and tasty frosting or icing-like trim is a necessary but time consuming task in the preparation of these foods for desserts or various festive and party occasions. The preparation thereof frequently results in a significant mess, with spillage and clutter as a consequence of the required mixing containers, food coloring and flavoring bottles, large and hard-to-clean baker's pastry bag or pump gun, etc..

This is especially true on a commercial level as well as on an active personal level when it is desired to prepare frostings of varying colors for differing festive occasions as well as to provide frostings or trim icings of varying flavorings to complement the cake or pastry with which the same is associated.

Heretofore it has been necessary for the baker or the active personal chef to maintain a supply of individual bottles of food coloring, for example, when it is desired to impart a particular hue or shade to cake frosting other than a conventional and basic white color.

The storage and handling of individual and frequently quite small bottles of food coloring is inconvenient and permits rather little control of the extent of coloration desired. Usually, the same is effected on the basis of a certain number of drops, for example, from a dropper nozzle. The coloring material, as well as the container itself, can easily end up spilling or flowing to undesired areas or work tables or indeed garments with great difficultly and inconvenience in cleaning the same.

In like manner, cake frostings are of necessity required to be any of a number of desirable flavors or delicate tastes to complement the cake or pastry, as lemon, chocolate, mocha, strawberry, etc.. In like manner, the chef must have available a plethora of individual bottles of liquid flavoring material as vanilla extract, lemon extract, etc. as may be requisite to achieve a particular flavoring at a particular time.

The containers for the various coloring materials and flavoring additives in order to be at all economically saleable as discrete bottled or packaged commodities of necessity contain in volume substantially more of a color or flavor character-modifying material than is required for any single or indeed even several cakes for decorating or flavoring purposes. As a consequence therefrom, such colorings or flavorings lie dormant on a shelf in the kitchen or other baker's work area for extended periods of time occupying space with the ever present hazard of spillage, loss, or deterioration of contents with resultant throwaway and waste of the product.

There is therefore lacking at the present time for both personal and commercial use a convenient, sanitary, versatile system for effecting desired character modification of white icing-like or frosting mix material which may be readily predetermined by the user and in like manner readily utilized to effect a desired degree of modification or alteration of the frosting characteristic. Similarly, it would be advantageous if the user could be enabled to acquire only that quantity which may be useful in the home environment for small quantities, or in a larger baking environment, as at a commercial level, quantities relative to the scale practiced.

SUMMARY OF THE INVENTION

The instant invention uniquely contemplates the availablility and interaction of selected individual components which together permit a quantity of frosting to be modified in character in a manner particularly selected by the preparer or baker, and similarly the extent of the alteration chosen may readily be controlled with reliable and predictable results.

The consequences thereof reduce the amount of materials required to have on hand with reduced spillage, wastage all as set forth above. Even more importantly, it provides to both the commercial and personal baker a tremendous versatility and variety of flavorings and colorings whereby those that are specifically wished may be selected and used without requiring purchase or wastage of the remainder.

Similarly, the cooperative elements of the invention herein facilitate creative expression and experimentation by the baker in producing new and unexpected color and flavor combinations all with equal facility as contrasted with such preparation of more conventional or standard colorings or flavorings.

To this end, my invention herein uniquely contemplates the provision and availability of premixed ready-to-use frosting or icing of essentially white color readily available in dispensing bags in a variety of convenient sizes as, illustratively, half-pound, one pound, etc..

For use with the convenient single-service packages of frosting, should it be desired to modify the character thereof as by either color or flavor, there are provided a plurality of individual containers in the form of elongated narrow flexible tubes containing quantities of various colorants, and in like manner similar squeezable tubes containing quantities of diverse favorants Simply stated, in order to effect a desired modification of the characteristic of ordinary white frosting, all or a portion of the contents of one coloring or flavoring container are manually expressed therefrom into the mix within the plastic porch containing the frosting, after which the pouch may be kneaded to effect full blending and homogenization of the additive to the frosting mix, whereby the same is uniformly distributed therein. Alternatively, should for decorative reasons the user desire a variegated or frosting hue of varying intensity over an extended area, the kneading of the coloration material within the icing after introduction thereof from the individual squeeze container may be limited at any point short of full blending and uniform coloration. The same technique may be applied to flavorant admixture.

Further, in connection with the invention, the individual elongated squeezable containers of either flavoring or colorant are marked with indicia thereon indicating for the benefit of the user to what extent the contents thereof should be expressed therefrom to achieve a desired degree of either flavor or tint or both.

In this manner, the baker, whether commercial or personal, in acquiring a quantity of frosting mix in the dispensing pouch alluded to hereinabove, may also at such time require and obtain just those colors which may be desired for the particular frosting or icing task at hand. Similarly, just those desired individual substantially single-service squeezable containers of flavoring may be obtained for the baking task at hand and it is not therefore necessary to acquire a substantial quantity of materials which may go to waste to the economic detriment of all parties.

As a consequence thereof, it is no longer necessary to mix frosting in bowls or cups with guesswork as to character modification as to either tint or flavor and wherein further neither the frosting nor the flavoring or tint contacts the human hands or is otherwise exposed to contamination prior to application from the frosting pouch to the pastry.

Similarly, after use, there is complete and ready disposability without necessity to store partially used containers of flavoring or coloring as noted above as well as the bag of frosting material proper when purchased in a convenient size for the cake decorating or related task at hand. Thereby, cleanup is easier, and more expeditious, again both on a personal and a professional or commercial level.

Further, if desired by the user, a protective screw cap or other closure provided on the dispensing pouch enables the user to cap and store any leftover frosting material for later use.

DESCRIPTION OF THE DRAWINGS

FIG. 1 is an elevation in perspective of an illustrative frosting pouch in accordance with the invention;

FIG. 2 is a fragmentary view in side section of an illustrative dispensing nozzle on the frosting pouch;

FIG. 3 is a side elevation in exploded relation of the dispensing nozzle, puncturable seal, and retainer cap of the illustrative dispensing nozzle;

FIG. 4 is a side elevation of an illustrative tint tube in accordance with the invention;

FIG. 5 is a side elevation of an illustrative flavoring tube in accordance with the invention;

FIG. 6 is a view of an illustrative holder of a plurality of color tubes of the type seen in FIG. 4; and, FIG. 7 is an illustrative view of a holder containing a plurality of flavor tubes of the type seen in FIG. 5.

DESCRIPTION OF THE PREFERRED EMBODIMENT

Referring to the drawings, the invention embraces a pouch 10 of flexible polymeric film material as seen in FIG. 1, which pouch may be filled in and sealed in manners conventional and well known in the art with a quantity of cake frosting material indicated therein at 12.

The pouch shown may include optionally a fin seal along one end thereof defining a hanger aperture at 14 for display or storage and the pouch may be formed from diverse polymeric materials as polyolefins, polyethylenes, polypropylenes, and the like, all as is well known in the art.

The pouch 10 further includes a dispensing nozzle 18 preferably at one corner thereof whereby the frosting material 12 within the pouch 10 may be readily dispensed therefrom by simple manual squeezing pressure on the pouch when the nozzle is open thereby to dispense or extrude the contents of the pouch onto a cake or other pastry, for example.

The pouch 10 as shown is quite illustrative and such bags or pouches are available in numerous forms in the art including multilayer laminate material for appropriate protection from oxidation, gas, or water vapor attack of the contents, and may embrace any of a number of forms of V-fold, triple seam, tubular extrusion, or other bag-making techniques or configurations.

In like manner, a dispensing nozzle associated with the bag 10 may take a variety of forms, an illustrative nozzle being shown at 18. To this end, and as seen in the enlarged views of FIGS. 2 and 3, in one form thereof the bag 10 includes corner wall film portions thereof at 20 which may be either pre-perforated or ruptured by the application of an internal nozzle member 22 which includes a rearward flared frusto-conical base at 24 and a forward threaded neck at 26 and having a through bore 28. The nozzle portion 22 as is evident in FIG. 2 is inserted through the bag from the inside to the outside whereby the conical portion 24 thereof generally engages the bag interior walls while the neck 26 projects through the preformed bag aperture or is conveniently manually ruptured therethrough. To close the nozzle prior to actual dispensing of the contents therefrom, a flexible sealing sheet 30 is provided, which sheet overlies the outer end of the neck 26 and is folded back against and over the external threads on the neck 26 by virtue of an external nozzle member 32 which in turn includes a conical portion 34 and an internally threaded neck at 36.

It will be seen that threaded application of the external closure nozzle member 32 to the internal portion 22 will cause the sealing disc 30 to be folded back as seen in FIG. 2 and interengaged between the mating threads so as to provide a positive leakproof seal against the contents of frosting 12 issuing from the neck of nozzle piece 22 as the disk 30 is drawn tightly across the opening thereof.

In like manner, the nozzle assembly is clamped tightly to the bag by the cooperation between the conical flanges 24 and 34 disposed respectively on the inside and outside of the bag wall material 20. Thus, the nozzle provides a rigid dispensing orifice in secured relation and the frosting 12 may readily be dispensed through the inner neck 26 upon rupture of the polymeric film 30 across the orifice thereof.

A number of alternate nozzle forms are available as are well known in the prior art, including nozzle elements which are adhesively secured or heat bonded to the polymeric material or have other configurations or orifice dimensions or include threaded or clamped rigid closures, for example. Similarly, as is evident, diverse nozzle tips might be applied to permit extrusion and dispensing of the frosting material in desired patterns or configurations as cruciform, star-like, or other shapes. The same may be incorporated in the assembly of my invention and do not form a unique part thereof apart from the principles thereof as set forth. In like manner, the pouch 10 need not be pre-perforated or ruptured, but rather nozzle element 22 may be fully integral therewith, bonded thereto, or disposed fully internally of the pouch and secured by nozzle element 32 with the bag wall material 20 itself serving as the orifice closure in the manner of the film 30.

Forming part of my invention and a unique and significant contribution thereto are the frosting character-modifying tubes illustrated respectively at 40 and 50 in FIGS. 4 and 5. The tubes 40 and 50 are similarly preferably formed of polymeric material of an elongated configuration and are sufficiently flexible so as to permit squeezing of the same as between the fingers to expel the contents therefrom. In the form of the invention shown herein, the tubes 40 are adapted to contain and receive therein a quantity of liquid or flowable coloring, as food coloring, for the purpose of imparting a desired hue or tint to the cake frosting, while the tubes 50 of similar nature are intended to receive a quantity of flavoring agent in liquid or flowable form, as for example coffee flavor, lemon flavor, etc. that one may wish to impart to the cake frosting.

The tubes 40 and 50 each include a removable, separable, or rupturable closure at one end thereof, illustratively shown as being a film of polymeric material 60 suitably adhesively bonded to the tubes 40 or 50 so as to block the opening while yet being readily rupturable to permit dispensing of the contents from the tubes. Obviously, the closures may embrace diverse other means known-in the art, as friction plugs, threaded closures and the like.

Preferably, the tubes 40, 50 are provided with an angled end at 42 and 52 respectively, thereby to define a relatively sharp point or corner area at 44 and 54 on the tubes.

In this manner, upon removal of the closure film 60 or other closure means associated with a respective tube 40 or 50, the user thereupon may use the pointed area of the tube at 44 or 54 to puncture the closure film as at 30 across the end of the dispensing nozzle 18 and thereby insert the tube substantially within the bag and thus deep into the frosting mix. To avoid unwanted expression of frosting mix, it is preferable although not absolutely necessary that the outside diameter of the coloring or flavoring tubes 40, 50 be only slightly less than the inside diameter of the neck bore 28 so as to leave little room for frosting to flow between the inverted tube and the neck during manipulation of the components.

In either event, after squeezing a desired quantity of the character-modifying material into the frosting, the closure 32 or like screw cap means is replaced, and the pouch 10 is then manually kneaded so as to blend and homogenize the modifying ingredient with the mix throughout the latter.

Upon appropriate kneading, the color or flavor will then become relatively uniform throughout the frosting mix and thereby be likewise uniform when applied to the cake or other pantry.

In this respect, it should be observed that for particular styling affects if desired or unique flavoring approaches, the pouch 10 may only be kneaded to an extent substantially less than that required for full mingling or blending of the ingredients so as to provide, for example, a more or less varigated and varying shade of color to the frosting mix, or in the case of flavoring agent, to have only localized and varying areas with the particular taste modifier therein.

While each tube 40 or 50 is of relatively small size for convenience, minimum wastage and generally adapted for single service use for an average cake, in this connection as a further approach thereto, it will be seen that more than one tube 40 or 50 of either flavoring agent or coloring may be used if desired. Indeed, the baker may elect to employ with a single frosting pouch 10 several tubes 40, 50 having completely differing colorings and flavorings.

Thus, one particular coloring tube 40 may be inserted fairly deeply into the frosting mix and a quantity of the charge expressed therefrom which would then be only slightly kneaded, while thereafer a second tube 40 containing a differing color could be inserted through the nozzle 18 only a shallow distance and a quantity of its coloring material expelled therefrom with limited kneadinq as may be desired.

In this manner, it will be seen that upon final expression of the pouch contents through the dispensing nozzle 18, the resultant icing or frosting will partake of one or more varying colors as well as varying hues of a given color in providing a desired pleasing, ornamental, or aesthetic effect. Similar effects may be achieved with the flavoring tubes.

In connection therewith, and to assist the baker in preparing the frosting to a desired color or taste level, indicia is provided on both the color of tint tubes 40 and the flavor tubes 50, as illustratively shown at 46 and 48 on tube 40 as for example an appropriate abbreviation of the word "Light" and "Medium" pointing out that when coloring material is expelled from tube 40 to a quantity sufficient to extend from the dispensing end of the tube at 52 to the marking 46, the tint will be of quite light nature, while if a further quantity of material is expelled from the tube to the marking at 48, the coloring effect will be somewhat greater and of an arbitrarily determined medium shade. In like manner, expulsion of a further portion or the entire contents of tube 40 into the mix 12 will result in the darkest possible coloration attainable with a single tube. Obviously, as noted above, additional tubes of the same color may be employed to further darken the frosting in a particular desired manner. Other or differing indicia may be employed as helpful, and may include quantity of contents, ingredients, etc.

In like manner, the flavoring tubes 50 have similar markings at 56 and 58 to thereby provide an indication to the user of the relative extent of flavor modification imparted depending upon the amount of agent expelled from the tube 50.

In this regard, it will be seen that with regular utilization of tubes as at 40 or 50 containing coloring material and flavoring agents that the user will become familiar with the relative effects thereof and can readily predetermine as well as experiment with the amount of coloration or flavoring desired in a given instance and with differing and larger size quantities of frosting mix.

In this regard, as indicated in FIG. 6 and 7, a convenient carton as at 70 may contain a plurality of tubes 40 of varying colors which the baker may keep in a convenient place and select differing colors therefrom as desired, while in like manner it is seen at 80 in FIG. 7 a collection of tubes 50 are likewise provided for selective use as desired.

With a complete supply of character-modifying tubes 40 and 50, as the same are consumed, the baker may conveniently and inexpensively replace one or more tubes at a time to keep an adequate supply on hand.

In like manner, the baker need only buy a pouch 10 of the desired size at a given time for the particular cake or pastry decorating job to be undertaken, which pouches may as indicated be in varying sizes as a quarter pound, half pound, etc. and which will require varying amounts of character-modifying material depending upon the bulk thereof.

What I claim as my invention is:

1. A cake frosting assembly comprising, a flexible pouch containing a quantity of prepared kneadable frosting for cakes,
   said pouch having a relatively rigid dispensing nozzle means defining a cylindrical bore through which the frosting may be expressed by manual pressure on the pouch,
   rupturable closure means closing said more, and,
   an elongated container having an edible, fluent frosting-modifying material therein, said container comprising an elongated flexible tube having a substantially uniform outer diameter approximating the inside diameter of said dispensing bore sufficient to allow said container to slidingly fit in said bore the full extent of said container, said container having an open end and a closed end wherein said open end includes a piercing point dimensioned to pierce said rupturable closure means, and removable closure means removably closing said container open end, whereby upon removal of said material container closure means, said tube may be slidably inserted into said bore to pierce and open said pouch rupturable closure means, and thereafter further inserted into said pouch rupturable to any desired extent, whereupon squeezing pressure upon said tube will introduce a user controlled amount of frosting-modifying material into said kneadable frosting.

2. The assembly of claim 1 wherein the frosting-modifying material imparts a desired color to the frosting.

3. The assembly of claim 1 wherein the frosting-modifying material imparts a desired flavor to the frosting.

4. The assembly of claim 1 wherein there are provided a plurality of said containers each containing a different coloring agent.

5. The assembly of claim 1 wherein there are provided a plurality of said containers each containing a different flavoring agent.

6. The assembly of claim 1 wherein said frosting-modifying container includes indicia thereon to indicate the amount of modification that may be achieved upon dispensing therefrom of a predetermined amount of said material into admixture with the frosting, thereby to predetermined the extent of characteristic modification of the frosting prior to dispensing thereof onto a cake or other pastry.

* * * * *

UNITED STATES PATENT AND TRADEMARK OFFICE
CERTIFICATE OF CORRECTION

PATENT NO. : 4,844,917
DATED : July 4, 1989
INVENTOR(S) : Marion DeLorimiere

It is certified that error appears in the above-identified patent and that said Letters Patent is hereby corrected as shown below:

In Claim 1, appearing in Column 6 at line 64, the line should read:

"rupturable closure means closing said bore, and,"

Signed and Sealed this

Twenty-seventh Day of February, 1990

Attest:

JEFFREY M. SAMUELS

Attesting Officer     Acting Commissioner of Patents and Trademarks